(12) United States Patent
Karode et al.

(10) Patent No.: US 10,143,961 B2
(45) Date of Patent: Dec. 4, 2018

(54) METHOD AND SYSTEM FOR PURIFICATION OF NATURAL GAS USING MEMBRANES

(71) Applicant: Air Liquide Advanced Technologies U.S. LLC, Houston, TX (US)

(72) Inventors: Sandeep K. Karode, Boothwyn, PA (US); Yong Ding, Wayland, MA (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 0 days.

(21) Appl. No.: 15/367,477

(22) Filed: Dec. 2, 2016

(65) Prior Publication Data

US 2017/0157556 A1 Jun. 8, 2017

Related U.S. Application Data

(63) Continuation-in-part of application No. 14/984,615, filed on Dec. 30, 2015.
(Continued)

(51) Int. Cl.
*B01D 53/22* (2006.01)
*B01D 71/52* (2006.01)
(Continued)

(52) U.S. Cl.
CPC ......... *B01D 53/225* (2013.01); *B01D 53/229* (2013.01); *B01D 53/261* (2013.01);
(Continued)

(58) Field of Classification Search
CPC .... B01D 53/22; B01D 53/225; B01D 53/226; B01D 53/229; B01D 53/261; B01D 53/268; B01D 2053/221; B01D 2053/224; B01D 69/10; B01D 71/52; B01D 71/56; B01D 71/80; B01D 2317/02; B01D 2317/04; C10L 3/101; C10L 3/104; C10L 3/106; C10L 2290/548
See application file for complete search history.

(56) References Cited

U.S. PATENT DOCUMENTS

| 4,466,946 A | 8/1984 | Goddin, Jr. et al. |
| 4,529,411 A | 7/1985 | Goddin, Jr. et al. |

(Continued)

FOREIGN PATENT DOCUMENTS

| WO | 9945035 | 9/1999 |
| WO | WO 2015/123257 | 8/2015 |

OTHER PUBLICATIONS

Brinkmann, Torsten et al., "Pilot scale investigations of the removal of carbon dioxide from hydrocarbon gas streams uisng poly(ethylene oxide)-poly(butylene terephthalate) PolyActiveTM) thin film composite membranes", Journal of Membrane Science, Apr. 2015, 489, pp. 237-247.*

(Continued)

*Primary Examiner* — Jason M Greene
(74) *Attorney, Agent, or Firm* — Christopher J. Cronin

(57) ABSTRACT

Natural gas may be purified by removing $C_{3+}$ hydrocarbons and $CO_2$ in respective first and second gas separation membrane stages to yield conditioned gas lower in $C_{3+}$ hydrocarbons and $CO_2$ in comparison to the un-conditioned natural gas.

35 Claims, 1 Drawing Sheet

Related U.S. Application Data

(60) Provisional application No. 62/262,652, filed on Dec. 3, 2015.

(51) Int. Cl.
*B01D 71/56* (2006.01)
*B01D 71/80* (2006.01)
*B01D 69/08* (2006.01)
*B01D 53/26* (2006.01)
*B01D 53/72* (2006.01)
*C10L 3/10* (2006.01)

(52) U.S. Cl.
CPC ........... *B01D 53/268* (2013.01); *B01D 53/72* (2013.01); *B01D 69/08* (2013.01); *B01D 71/52* (2013.01); *B01D 71/56* (2013.01); *B01D 71/80* (2013.01); *C10L 3/101* (2013.01); *C10L 3/104* (2013.01); *C10L 3/106* (2013.01); *B01D 2053/224* (2013.01); *B01D 2325/20* (2013.01); *C10L 2290/08* (2013.01); *C10L 2290/542* (2013.01); *C10L 2290/548* (2013.01)

(56) References Cited

U.S. PATENT DOCUMENTS

| | | | | |
|---|---|---|---|---|
| 4,963,165 | A * | 10/1990 | Blume | B01D 71/80 427/385.5 |
| 5,401,300 | A * | 3/1995 | Lokhandwala | B01D 53/22 95/49 |
| 5,482,539 | A | 1/1996 | Callahan | |
| 5,557,030 | A | 9/1996 | Markovs et al. | |
| 5,688,307 | A | 11/1997 | Pinnau et al. | |
| 5,776,990 | A | 7/1998 | Hedrick et al. | |
| 5,964,923 | A | 10/1999 | Lokhandwala | |
| 6,053,965 | A * | 4/2000 | Lokhandwala | B01D 53/229 95/49 |
| 6,221,131 | B1 | 4/2001 | Behling et al. | |
| 6,368,382 | B1 | 4/2002 | Chiou | |
| 6,648,944 | B1 * | 11/2003 | Baker | B01D 53/225 95/39 |
| 6,860,920 | B2 | 3/2005 | Simmons | |
| 8,083,834 | B2 | 12/2011 | Zhou et al. | |
| 8,419,828 | B2 | 4/2013 | Diaz et al. | |
| 8,575,414 | B2 | 11/2013 | Liu et al. | |
| 8,912,524 | B2 | 12/2014 | Wang et al. | |
| 2007/0006732 | A1 | 1/2007 | Mitariten | |
| 2010/0186586 | A1 | 7/2010 | Chinn et al. | |
| 2012/0085232 | A1 * | 4/2012 | Sethna | B01D 53/226 95/41 |
| 2012/0157743 | A1 | 6/2012 | Liu et al. | |
| 2012/0223014 | A1 * | 9/2012 | Boam | B01D 69/10 210/644 |
| 2013/0111949 | A1 * | 5/2013 | Gearhart | B01D 53/229 62/617 |
| 2013/0253250 | A1 * | 9/2013 | Gulyansky | B01D 53/226 585/818 |
| 2013/0255490 | A1 | 10/2013 | Matteucci et al. | |
| 2014/0251897 | A1 | 9/2014 | Livingston et al. | |
| 2014/0345880 | A1 | 11/2014 | Enis et al. | |
| 2015/0053079 | A1 | 2/2015 | Koros et al. | |
| 2015/0059577 | A1 | 3/2015 | Lokhandwala | |
| 2017/0014753 | A1 * | 1/2017 | Peters | B01D 53/226 |

OTHER PUBLICATIONS

International Search Report and Written Opinion for PCT/US2016/064591, dated Feb. 21, 2017.
Nunes, et al, "Dense hydrophilic composite membranes for ultrafiltration;" Journal of Membrane Science 106 (1995) 49-58; p. 50, section 2.
Yampolskii, et al, "Membrane Gas Separation;" Wiley, 2010; p. 230, paragraphs 2-3; p. 231, paragraph 3; p. 231, figure 12,1(b).
Rabiee, H., et al., Gas transport properties of reverse-selective poly(ether-b-amide6)/[Emim][BF4] gel membranes for CO2/light gases separation, J. Membrane Sci. vol. 476, pp. 286-302 (2015).
Stern, S. A., et al., Permeability of silicone polymers to ammonia and hydrogen sulfide, J. Appl. Polym. Sci., vol. 38, pp. 2131-2131 (1989).
Baker, R., Future directions of membrane gas-separation technology, Membrane Technology, vol. 183, pp. 5-10 (2001).
Hao, J., et al., Upgrading low-quality natural gas with H2S- and CO2-selective polymer membranes. Part I. Process design and economics of membrane stages without recycle streams, Journal of Membrane Science vol. 209, pp. 177-206 (2002).
Esposito, et al., "Pebax/PAN hollow fiber membranes for CO2/CH4 separation," Chemical Engineering and Processing, 94, (2015), pp. 53-61.
Li, et al., "High-Performance Composite Membrane with Enriched CO2-philic Groups and Improved Adhesion at the Interface," ACS Appl. Mater, Interfaces, 2014, 6, pp. 6654-6663.

* cited by examiner

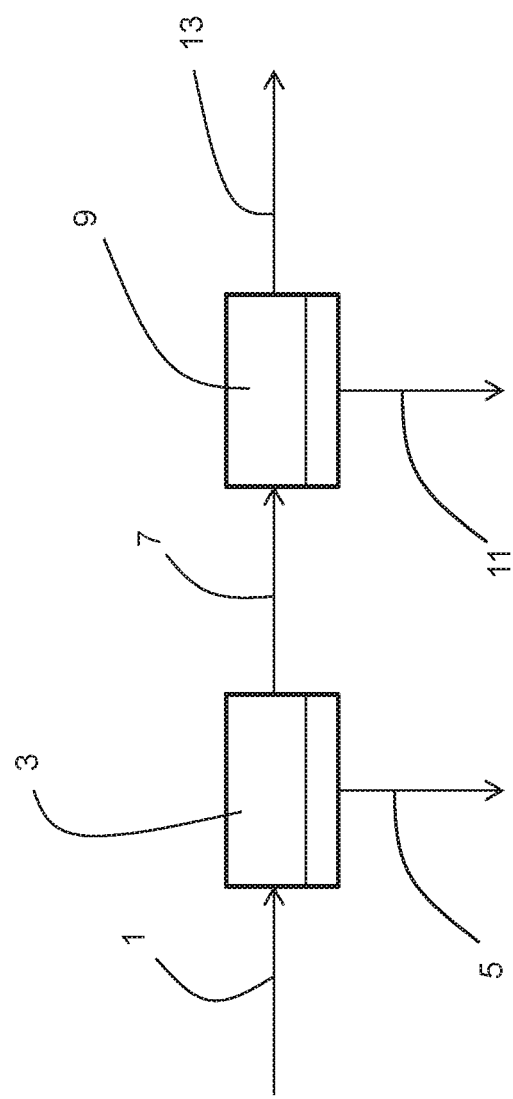

METHOD AND SYSTEM FOR PURIFICATION OF NATURAL GAS USING MEMBRANES

CROSS-REFERENCE TO RELATED APPLICATIONS

This application is a Continuation In Part of U.S. Non-Provisional patent application Ser. No. 14/984,615, filed Dec. 30, 2015 which claims the benefit of priority under 35 U.S.C. § 119 (e) to U.S. Provisional Patent Application No. 62/262,652, filed Dec. 3, 2015, the entire contents of each of which are incorporated herein by reference.

BACKGROUND

Field of the Invention

The present invention relates to the purification of natural gas using gas separation membranes.

Related Art

Water, carbon dioxide, hydrogen sulfide and heavy hydrocarbons are common contaminants for natural gas. During the gas conditioning process, these contaminants are removed so that the natural gas can be used onsite or transported to the pipeline. Depending upon whether emissions of the reject gas from such a gas conditioning process are subject to governmental regulation, the reject stream from the gas conditioning process may be flared. The reject stream may instead be re-injected deep underground, thus producing near zero air emissions.

The conditioned gas has to meet certain natural gas pipeline specifications, such as a carbon dioxide concentration below 2% (vol/vol), a $C_{3+}$ hydrocarbon dewpoint of no more than $-4°$ F. ($-20°$ C.), and an $H_2S$ concentration of less than 2 ppm. The water concentration should be below 7 lb per million std $ft^3$ per day (11.2 kg per million std $m^3$ per day) and sometimes as much as below 5 lb per million std $ft^3$ per day (8.0 kg per million std $m^3$ per day). Additionally, the $C_{3+}$ hydrocarbon content of the conditioned gas should be limited so that the BTU/caloric content of the conditioned gas is about 950-1050 Btu (240-265 kcal).

In the event that the reject stream is re-injected deep underground, it has to be dry in to avoid corrosion of the injection line and the formation of hydrocarbon hydrates. The water content for the reinjected stream has to be below 50 ppm (vol/vol) and sometimes as low as 1 ppm (vol/vol).

In the natural gas conditioning process, gas separation membranes are normally utilized for carbon dioxide removal due to their relatively small foot print and light weight and their relatively high energy efficiency. Gas separation membranes can generate conditioned gas with a suitable moisture content. However, the reject gas is at a relatively lower pressure and it is of course enriched with water. The conventional solution is to first dehydrate the unconditioned feed gas with a molecular sieve and then treat the dehydrated gas with a gas separation membrane purification step. This type of hybrid process can indeed meet the specifications for both the conditioned gas and gas to be re-injected. However, the relatively high footprint, volume, and mass of the molecular sieve dehydration process are a concern for many natural gas conditioning applications, especially for off shore applications where the footprint, volume, and capacity to withstand massive equipment are at a premium.

It is well documented that glassy polymers, such as polyimide, polysulfone, polybenzimidazole, etc., exhibit exceptional high intrinsic $CO_2$/methane selectivity. However, the selectivity and permeance of the membranes prepared from those materials often quickly decrease once they are used for natural gas conditioning in the presence of $C_{3+}$ hydrocarbons. This loss of membrane performance is caused by condensation of the $C_{3+}$ hydrocarbons on the membrane surface. The conventional solution for this problem is to use a system including a molecular sieve and carbon trap for removing the $C_{3+}$ hydrocarbons upstream of $CO_2$ removal. Although these pretreatment systems can effectively remove heavy hydrocarbons from the natural gas stream, the cost of the pretreatment sometime can be prohibitive. Indeed, the cost of the pretreatment system can be as high as 50% of the total system cost (pretreatment plus membrane).

SUMMARY

There is disclosed a method for purification of natural gas including methane, $CO_2$, and $C_{3+}$ hydrocarbons. The method comprises the following steps. A feed gas consisting of the natural gas is fed to a first gas separation membrane stage comprising one or more membranes in series or parallel having a selective layer that is selective for $C_{3+}$ hydrocarbons over methane. A first permeate stream is withdrawing from the membrane(s) of the first stage that is enriched in $C_{3+}$ hydrocarbons in comparison to the feed gas. A first retentate stream is withdrawn from the membrane(s) of the first stage that is deficient in $C_{3+}$ hydrocarbons in comparison to the feed gas. The first retentate stream is fed to a second gas separation membrane stage comprising one or more membranes in series or parallel having a selective layer that is selective for $CO_2$ over methane. A second permeate stream is withdrawn from the membrane(s) of the second stage that is enriched in $CO_2$ in comparison to the feed gas. A second retentate stream is withdrawn from the membrane(s) of the second stage that is deficient in $CO_2$ in comparison to the feed gas.

There is also disclosed a system for purification of natural gas including methane, CO2, and $C_{3+}$ hydrocarbons, comprising: a source of natural gas; a first gas separation membrane stage comprising one or more membranes in series or parallel fluidly communicating with said source, each membrane of the first gas separation membrane stage having a selective layer that is selective for $C_{3+}$ hydrocarbons over methane; and a second gas separation membrane stage comprising one or more membranes fluidly in series or parallel communicating with a retentate outlet(s) of the membranes of the first gas separation membrane stage so as to receive retentate from the first gas separation membrane stage as a feed gas in the second gas separation membrane stage, each membrane of the second gas separation membrane stage having a selective layer that is selective for $CO_2$ over methane.

The method and/or system may include one or more of the following aspects:
- water is removed from the feed gas prior to feeding the feed gas to the first gas separation membrane stage.
- said water removal comprises feeding the feed gas to a molecular sieve adapted and configured to remove water from fluids.
- said water removal comprises feeding the feed gas to a dehydration gas separation membrane.
- the first and/or the second permeate streams is combusted as a flare gas.

the feed gas is obtained from natural gas extracted from a subterranean or subsea geological formation and said step further comprises injecting the first and/or second stage permeate streams into the geological formation.

the first and/or second permeate streams are dehydrated prior to injection into the geological formation such that a water content in the first and/or second permeate stream injected into the geological formation is no more than 50 ppm (vol/vol).

each of the one or membranes of the first gas separation membrane stage have a separation layer made of a copolymer or block polymer of tetramethylene oxide, and/or propylene oxide, or ethylene oxide.

a pressure drop between a pressure of the feed gas and a pressure of the retentate gas is less than 50 psi (3.45 bar).

a pressure drop between a pressure of the feed gas and a pressure of the retentate gas is less than 30 psi (2.07 bar).

a pressure drop between a pressure of the feed gas and a pressure of the retentate gas is less than less than 20 psi (1.38 bar).

the one or more membranes of the first gas separation membrane stage have a methane permeance of less than 68 gas permeation units (22.4 mol/m$^2$·sec·Pa).

the one or more membranes of the first gas separation membrane stage have a methane permeance of less than 34 GPU.

the one or more membranes of the first gas separation membrane stage have a methane permeance of less than 20 GPU.

the one or membranes of the first gas separation membrane stage have a separation layer made of a copolymer or block polymer of the formula:

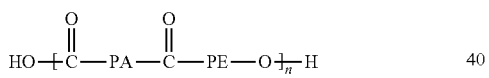

where PA is an aliphatic polyamide having 6 or 12 carbon atoms and PE is either poly(ethylene oxide) poly(tetramethylene oxide).

the one or membranes of the first gas separation membrane stage have a separation layer made of repeating units of the following monomers:

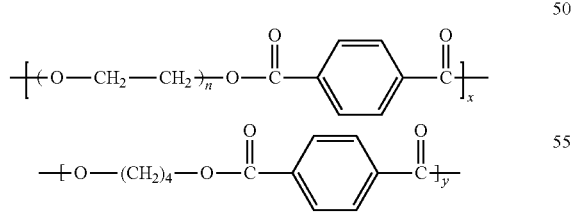

the separation layer of the membranes of the second gas separation membrane stage is a polymer or copolymer selected from cellulose acetate, polysulfones, and polyimides.

the separation layer of the membranes of the second gas separation membrane stage is a polyimide essentially consisting of repeating units of dianhydride-derived units of formula (I) and diamine-derived units

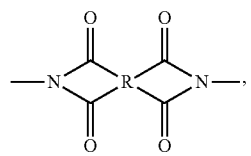

where each R is the molecular segment of formula (3)

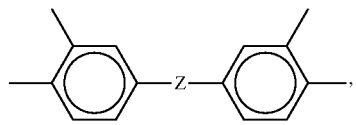

each Z is the molecular segment of formula (5),

20% of the diamine-derived units are the diamine-derived moiety of either formula (A) or formula (B) and 80% of the diamine-derived units are the diamine-derived moiety of formula (C), where when the diamine-derived moiety of formula (A) is the case, only one of $X_1$, $X_2$, $X_3$, and $X_4$ is a methyl group and the others are hydrogen, and where when the diamine-derived moiety of formula (B) is the case, only one of $X_5$, $X_6$, $X_7$, and $X_8$ is a methyl group and the others are hydrogen:

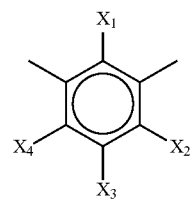

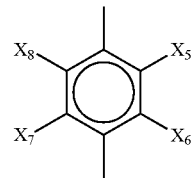

each of the one or more membranes of the first gas separation membrane stage are formed as flat films or as a plurality of hollow fibers.

each of the one or more membranes of the first gas separation membrane stage has a separation layer that is supported by a support layer.

each of the support layers is made of a polyimide, polysulfone, or polyether ether ketone.

each of the support layers is porous and is made of polyether ether ketone.

each of the membranes of the second gas separation membrane stage is made of cellulose acetate, a polysulfone, or a polyimide.

BRIEF DESCRIPTION OF THE DRAWINGS

The FIG is a schematic of the method and system of the invention.

DESCRIPTION OF PREFERRED EMBODIMENTS

Natural gas may be conditioned with gas separation membranes so as to meet desired levels of C3+ hydrocarbons, $CO_2$, and optionally $H_2S$. The unconditioned gas may optionally be pre-treated with a molecular sieve (or equivalent dehydration technique) upstream of the gas separation membranes in order to dry the unconditioned gas prior to membrane separation. The conditioning process includes feeding the feed gas (i.e., the unconditioned natural gas which has optionally been dehydrated with a molecular sieve or equivalent dehydration technique) to a first gas separation membrane stage.

A feed gas of natural gas or conditioned (i.e., dehydrated) natural gas is fed as feed gas stream 1 to one or gas separation membranes of the first gas separation membrane stage 3 in series or parallel. A first stage permeate stream 5 is withdrawn from a permeate side of the first gas separation membrane stage 3 and a first stage retentate stream 7 is withdrawn from the feed gas side of the first gas separation membrane stage 3. The membranes of the first gas separation membrane stage 3 include a selective layer that is selective for $C_{3+}$ hydrocarbons over methane. By "selective for $C_{3+}$ hydrocarbons over methane", we mean that, as a whole, the $C_{3+}$ hydrocarbons become enriched in the permeate stream 5 in comparison to the feed gas 1 and the $C_{3+}$ hydrocarbons dewpoint of the retentate is lowered. Those skilled in the art of gas separation membrane technology will recognize that the $C_{3+}$ hydrocarbons dewpoint is the temperature at which cooling of the retentate 7 will cause condensation of $C_{3+}$ hydrocarbons.

The first retentate stream 7 is fed to a second gas separation membrane stage 9 containing one or more gas separation membranes in series or in parallel. The membranes of the second gas separation membrane stage 9 include a selective layer that is selective for $CO_2$ over methane. A second stage permeate stream 11 is withdrawn from a permeate side of the second gas separation membrane stage 9 and a second stage retentate stream 13 is withdrawn from the feed gas side of the second gas separation membrane stage 9.

If flaring of the first and/or second stage permeate streams 5, 11 is prohibited due to environmental regulations or if it is economical or otherwise desirable to not flare such streams, it may be re-injected deep underground (or in the case of subsea natural gas extraction, deep under the seabed). In the event that the first and/or second stage permeate stream 5, 11 contains too high of a moisture content to allow re-injection as is, such a stream may first be dehydrated by any suitable technique for gas dehydration to reach a moisture content of no more than 50 ppm (vol/vol) and as low as 1 ppm (vol/vol).

If flaring is otherwise allowable and desired instead of re-injection, the first and/or second stage permeate stream 5, 11 may be combusted as a flare gas with or without additional separate flare gases associated with other gases collected in the natural gas extraction and conditioning processes.

The separation layer of each of, or at least one of, the gas separation membranes the first gas separation membrane stage 3 may be made of a copolymer or block polymer of tetramethylene oxide, and/or propylene oxide, or ethylene oxide. These types of polymers exhibit modest productivity (i.e., permeance) for methane and preferential permeation of $C_{3+}$ hydrocarbons. Due to the modest methane productivity of these polymers in comparison with silicone based polymers, membranes with low methane productivity for methane can be conveniently achieved. Through selection of a separation layer with modest methane productivity and preferential permeation of $C_{3+}$ hydrocarbons, for the membrane(s) of the first gas separation stage membrane 3, only a relatively low pressure drop across the first gas separation membrane stage 3 (i.e., the difference in pressure between the feed gas 1 and the retentate gas 7) may be realized. As a result, there is no need for recompression of the first retentate 7 before it is fed to the gas separation membrane(s) of the second gas separation membrane stage 9. Typically, the pressure drop between the feed gas 1 and the retentate gas 7 is less than 50 psi (3.45 bar). The pressure drop may be less than 30 psi (2.07 bar) or even less than 20 psi (1.38 bar). Typically, the membrane productivity for methane should be below 68 GPU (22.4 mol/m$^2$·sec·Pa). Often, it is below 34 GPU or even below 20 GPU.

Copolymers or block polymers of tetramethylene oxide, and/or propylene oxide, or ethylene oxide may be conveniently synthesized, such as the polyester ether disclosed in U.S. Pat. No. 6,860,920, the polyester ethers of which are incorporated by reference.

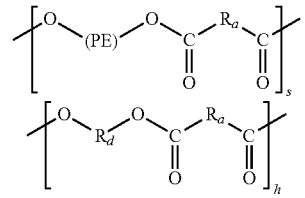

where PE may be one or more of the following structures:

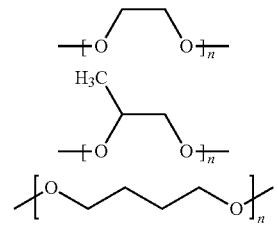

Other copolymers or block polymers of tetramethylene oxide, and/or propylene oxide, or ethylene oxide may be conveniently synthesized, such as polyimide ether disclosed in U.S. Pat. No. 5,776,990, the polyimide ethers of which are incorporated by reference.

The copolymers can be further obtained by copolymerization of acrylated monomers containing oligomeric propylene oxide, ethyelene oxide, or tetramethyelene oxide. Commercially available copolymers include poly(ether-b-amide) multiblock copolymers available from Arkema under the trade name of PEBAX, and polybutylene terephthalate) ethylene oxide copolymer available under the trade name of Polyactive.

Typically, the PEBAX polymers from Arkema include PEBAX 7233, PEBAX 7033, PEBAX 6333, PEBAX 2533, PEBAX 3533, PEBAX 1205, PEBAX 3000, PEBAX 1657, or PEBAX 1074. PEBAX 1657 exhibits a methane permeability of 5.12 Barrer. H. Rabiee, et al., J. Membrane Sci. vol. 476, pp. 286-302 (2015). In contrast, PDMS exhibits a methane permeability of 800 Barrer. Stern, et al., J. Appl. Polym. Sci., Vol. 38, 2131(1989). The PEBAX polymers have the following general chemical structure:

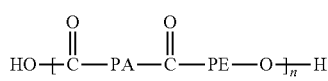

Where PA is an aliphatic polyamide "hard" block (nylon 6 [PA6] or nylon 12 [PA12], and PE denotes a polyether "soft" block, either polyethylene oxide) [PEO] or poly(tetramethylene oxide) [PTMEO].

Commercial available PolyActive multiblock copolymers have the following general chemical structure:

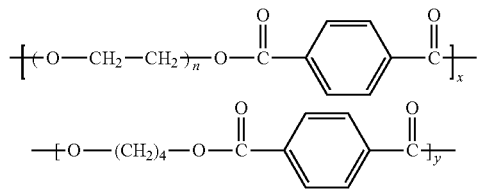

While the gas separation membrane(s) of the first gas separation membrane stage 3 may have any configuration known in the field of gas separation, typically they are formed as a flat film or as a plurality of hollow fibers. In one embodiment, the separation layer is supported by a support layer where the separation layer performs the desired separation while the support layer provides mechanical strength. In the context of hollow fibers, the separation layer is configured as a sheath surrounding a core made of the support layer. Regardless of the configuration of the membrane, the support layer may be any porous substrate known in the field of gas separation membranes and includes but is not limited to, polyimides, polysulfones, and polyether ether ketones. Typical hollow fiber membrane supports are PEEK porous substrate fibers commercially available from Air Liquide Advanced Separations, a unit of Air Liquide Advanced Technologies, US.

Typically, the gas separation membrane(s) of the first gas separation membrane stage 3 includes membranes commercially available from Medal under the trade name PEEK-SEP.

The separation layer of the membrane(s) of the second gas separation membrane stage 9 may be made of any polymer or copolymer known in the field of gas separation membranes that is selective for $CO_2$ over methane. Typically, the separation layer of the membranes of the second gas separation membrane stage 9 is made of cellulose acetate, a polysulfone, or a polyimide. Typically, the polyimide essentially consists of repeating units of dianhydride-derived units of formula (I) and diamine-derived units.

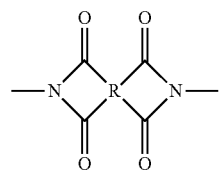

(I)

Each R is a molecular segment independently selected from the group consisting of formula (1), formula (2), formula (3), and formula (4):

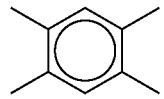

(1)

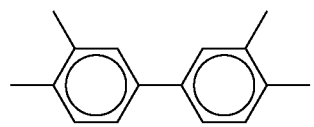

(2)

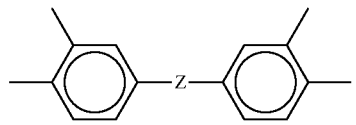

(3)

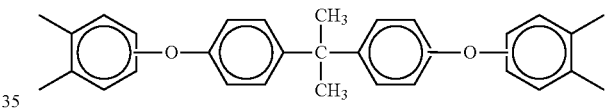

(4)

Each Z is a molecular segment independently selected from the group consisting of formula (5), formula (6), formula (7), formula (8), and formula (9).

(5)

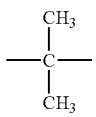

(6)

(7)

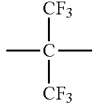

(8)

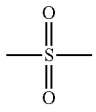

(9)

Each diamine-derived unit is a diamine-derived moiety independently selected from the group consisting of formula (A), formula (B), formula (C), formula (D), formula (E), formula (F), formula (G), and formula (H):

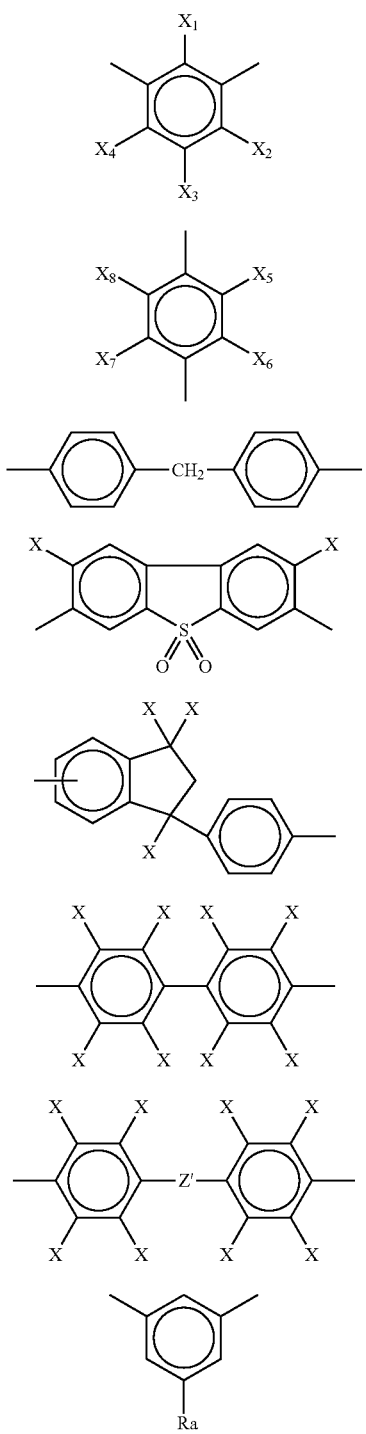

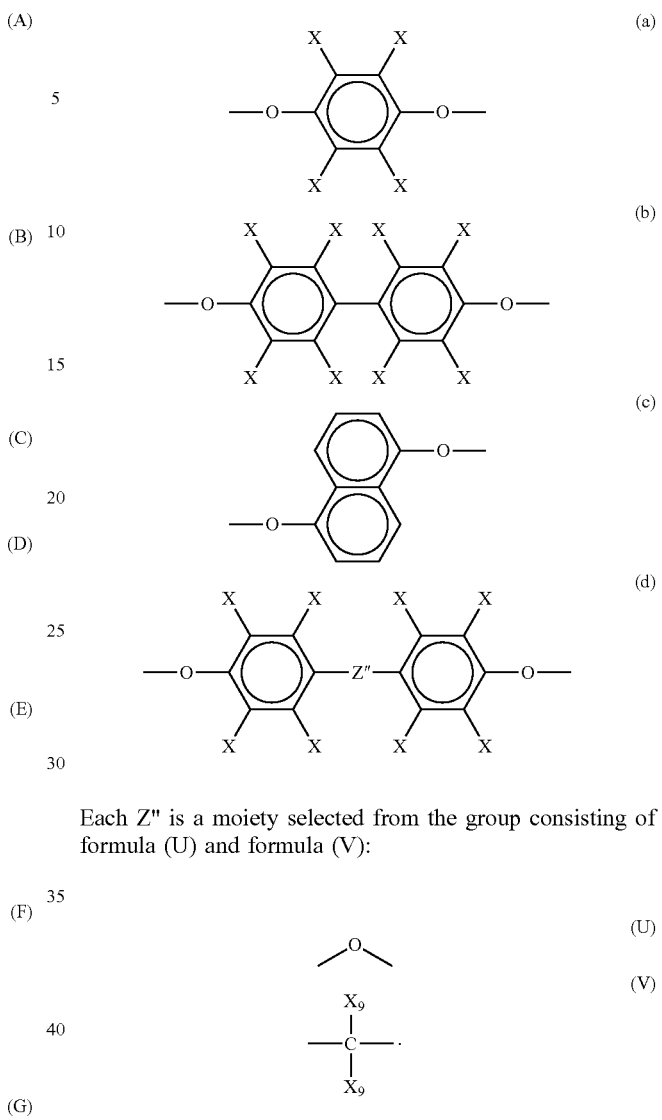

Each X, $X_1$, $X_2$, $X_3$, $X_4$, $X_5$, $X_6$, $X_7$, and $X_8$ is independently selected from the group consisting of hydrogen, an aromatic group, and a straight or branched $C_1$ to $C_6$ alkyl group. Each $R_a$ is a straight or branched $C_1$ to $C_6$ alkyl group having either a terminal hydroxyl group, a terminal carboxylic acid group, or a terminal carbon to carbon double bond. Each Z' is a molecular segment selected from the group consisting of formula (a), formula (b), formula (c), and formula (d):

Each Z" is a moiety selected from the group consisting of formula (U) and formula (V):

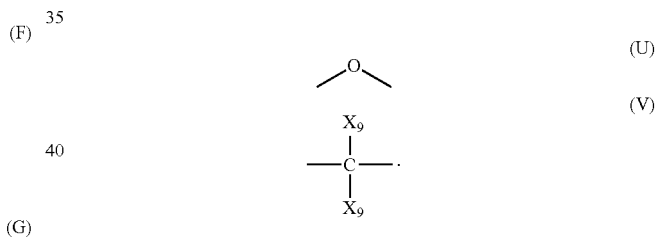

Each $X_9$ is selected from the group consisting of hydrogen, a straight or branched alkyl group having 1 to 6 carbon atoms, and a straight or branched pefluoroalkyl group having 1 to 6 carbon atoms.

In one particular embodiment of the polyimide, R is the molecular segment of formula (3), Z is the molecular segment of formula (5), 20% of the diamine-derived units are the diamine-derived moiety of either formula (A) or formula (B) and 80% of the diamine-derived units is the diamine-derived moiety of formula (C). When the diamine-derived moiety of formula (A) is the case, only one of $X_1$, $X_2$, $X_3$, and $X_4$ is a methyl group and the others are hydrogen. When the diamine-derived moiety of formula (B) is the case, only one of $X_5$, $X_6$, $X_7$, and $X_8$ is a methyl group and the others are hydrogen. This particular polymide is sold by Evonik Fibres GmbH under the trademark P84® (hereinafter the P84® polyimide). P84 has a $CO_2$ solubility at 35° C. and 10 bar pressure of >0.07 [$cm^3$(STP)/$cm^3$(polymer)-cmHg] and a glass transition temperature of 316° C.

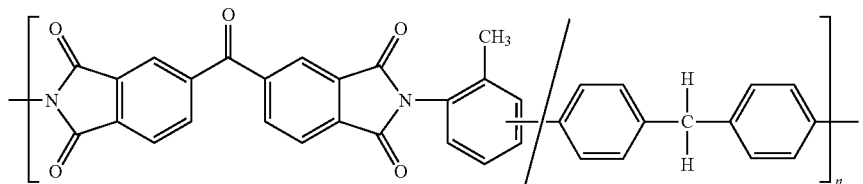

P84

While the gas separation membrane(s) of the second gas separation membrane stage 9 may have any configuration known in the field of gas separation, typically they are formed as a flat film or as a plurality of hollow fibers. In one embodiment, the separation layer of each of, or at least one of, the gas separation membranes of the second gas separation membrane stage 9 is supported by a support layer where the separation layer performs the desired separation while the support layer provides mechanical strength. In the context of hollow fibers, the separation layer is configured as a sheath surrounding a core made of the support layer. Regardless of the configuration of the membrane, the support layer may be any porous substrate known in the field of gas separation membranes. Suitable membranes for the second gas separation membrane stage are commercially available from Air Liquide Advanced Separations, a unit of Air Liquide Advanced Technologies, US.

PROPHETIC EXAMPLES

Example

A computer simulation was performed in order to demonstrate the process of the invention. In the simulation, a feed gas with the following gas composition was fed into a composite membrane including a PEBAX separation layer and a PEEK support layer with methane permeance of 15 GPU at 1000 psia and 30 C. The membrane cartridge exhibits a pressure drop of only 37 psi.

|  | FEED | RAFF | PERM |
|---|---|---|---|
| F, MMSCFD (60 F.) | 1.257 | 1 | 0.2567 |
| PRESS, psia | 1000 | 963.88 | 26.3 |
| CONCENTRATIONS, mol % |  |  |  |
| WATER | 0.1991 | 0.0043 | 0.9582 |
| CARBON_DIOXIDE | 44.9649 | 37.0415 | 75.8347 |
| NITROGEN | 0.4978 | 0.6132 | 0.0486 |
| ETHANE | 5.5858 | 5.9936 | 3.9967 |
| PROPANE | 3.6243 | 3.7977 | 2.9486 |
| N-BUTANE | 1.613 | 1.4971 | 2.0646 |
| N-PENTANE | 0.4978 | 0.3258 | 1.1681 |
| N-HEXANE | 0.2091 | 0.1007 | 0.6313 |
| METHANE | 42.8082 | 50.6262 | 12.3492 |

Comparative Example 2

A computer simulation was also attempted for the purpose of demonstrating a process that is not of the invention. A silicone based membrane with methane permeance of 120 GPU is used. The same feed condition as in the Example was used for the calculation. The pressure drop is so significant that the calculation did not converge.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for purification of natural gas including methane, $CO_2$, and $C_{3+}$ hydrocarbons, comprising the steps of:
    feeding a feed gas consisting of the natural gas to a first gas separation membrane stage comprising one or more membranes in series or parallel having a selective layer that is selective for $C_{3+}$ hydrocarbons over methane;
    withdrawing a first permeate stream from the membrane(s) of the first stage that is enriched in $C_{3+}$ hydrocarbons in comparison to the feed gas;

withdrawing a first retentate stream from the membrane(s) of the first stage that is deficient in $C_{3+}$ hydrocarbons in comparison to the feed gas;

feeding the first retentate stream to a second gas separation membrane stage comprising one or more membranes in series or parallel having a selective layer that is selective for $CO_2$ over methane;

withdrawing a second permeate stream from the membrane(s) of the second stage that is enriched in $CO_2$ in comparison to the feed gas; and withdrawing a second retentate stream from the membrane(s) of the second stage that is deficient in $CO_2$ in comparison to the feed gas, wherein:

the one or more membranes of the first gas separation membrane stage have a methane permeance of less than 68 gas permeation units (22.4 mol/m²·sec·Pa); and the one or membranes of the first gas separation membrane stage have a separation layer made of: 1) a copolymer or block polymer of tetramethylene oxide, 2) a copolymer or block polymer of tetramethylene oxide and propylene oxide, 3) a copolymer or block polymer of propylene oxide, or 4) a copolymer or block polymer of ethylene oxide, terephthalate, and tetramethylene terephthalate.

2. The method of claim 1, further comprising removing water from the feed gas prior to feeding the feed gas to the first gas separation membrane stage.

3. The method of claim 2, wherein said step of removing water comprises feeding the feed gas to a molecular sieve adapted and configured to remove water from fluids.

4. The method of claim 2, wherein said step of removing water comprises feeding the feed gas to a dehydration gas separation membrane.

5. The method of claim 1, further comprising the step of combusting the first and/or the second permeate streams as a flare gas.

6. The method of claim 1, wherein the feed gas is obtained from natural gas extracted from a subterranean or subsea geological formation and said step further comprises injecting the first and/or second stage permeate streams into the geological formation.

7. The method of claim 6, further comprising dehydrating the first and/or second permeate streams prior to injection into the geological formation such that a water content in the first and/or second permeate stream injected into the geological formation is no more than 50 ppm (vol/vol).

8. The method of claim 1, wherein a pressure drop between a pressure of the feed gas and a pressure of the first retentate stream is less than 50 psi (3.45 bar).

9. The method of claim 1, wherein a pressure drop between a pressure of the feed gas and a pressure of the first retentate stream is less than 30 psi (2.07 bar).

10. The method of claim 1, wherein a pressure drop between a pressure of the feed gas and a pressure of the first retentate stream is less than less than 20 psi (1.38 bar).

11. The method of claim 1, wherein the one or more membranes of the first gas separation membrane stage have a methane permeance of less than 34 GPU.

12. The method of claim 1, wherein the one or more membranes of the first gas separation membrane stage have a methane permeance of less than 20 GPU.

13. A method for purification of natural gas including methane, $CO_2$, and $C_{3+}$ hydrocarbons, comprising the steps of:

feeding a feed gas consisting of the natural gas to a first gas separation membrane stage comprising one or more membranes in series or parallel having a selective layer that is selective for $C_{3+}$ hydrocarbons over methane;

withdrawing a first permeate stream from the membrane(s) of the first stage that is enriched in $C_{3+}$ hydrocarbons in comparison to the feed gas;

withdrawing a first retentate stream from the membrane(s) of the first stage that is deficient in $C_{3+}$ hydrocarbons in comparison to the feed gas;

feeding the first retentate stream to a second gas separation membrane stage comprising one or more membranes in series or parallel having a selective layer that is selective for $CO_2$ over methane;

withdrawing a second permeate stream from the membrane(s) of the second stage that is enriched in $CO_2$ in comparison to the feed gas; and withdrawing a second retentate stream from the membrane(s) of the second stage that is deficient in $CO_2$ in comparison to the feed gas, wherein:

the one or more membranes of the first gas separation membrane stage have a methane permeance of less than 68 gas permeation units (22.4 mol/m²·sec·Pa); and the one or membranes of the first gas separation membrane stage have a separation layer made of a copolymer or block polymer of the formula:

$$HO \mathrm{-\!\!\!\left[\!\!-C-PA-C-PE-O\!\!-\right]_{\mathit{n}}\!\!\!-}H$$

(with two C=O groups)

where PA is an aliphatic polyamide having 6 or 12 carbon atoms and PE is either poly(ethylene oxide) poly(tetramethylene oxide).

14. The method of claim 1, wherein one or membranes of the first gas separation membrane stage have a separation layer made of repeating units of the following monomers:

$$\mathrm{-\!\!\left[\!\!-O-CH_2-CH_2\!\!-\right]_{\mathit{n}}\!\!-O-C(\!=\!\!O)\!-\!\!\langle\mathrm{Ar}\rangle\!-\!C(\!=\!\!O)\!-\right]_{\mathit{x}}\!\!-}$$

$$\mathrm{-\!\!\left[\!\!-O-(CH_2)_4-O-C(\!=\!\!O)\!-\!\!\langle\mathrm{Ar}\rangle\!-\!C(\!=\!\!O)\!-\right]_{\mathit{y}}\!\!-}.$$

15. The method of claim 1, wherein the one or more membranes of the first gas separation membrane stage are formed as flat films or as a plurality of hollow fibers.

16. The method of claim 1, wherein each of the one or more membranes of the first gas separation membrane stage has a separation layer that is supported by a support layer.

17. The method of claim 16, wherein each of the support layers is made of a polyimide, polysulfone, or polyether ether ketone.

18. The method of claim 17, wherein each of the support layers is porous and is made of polyether ether ketone.

19. The method of claim 1, wherein each of the membranes of the second gas separation membrane stage is made of cellulose acetate, a polysulfone, or a polyimide.

20. A system for purification of natural gas including methane, CO2, and $C_{3+}$ hydrocarbons, comprising:

a source of natural gas;

a first gas separation membrane stage comprising one or more membranes fluidly in series or parallel communicating with said source, each membrane of the first gas separation membrane stage having a selective layer that is selective for $C_{3+}$ hydrocarbons over methane; and a second gas separation membrane stage comprising one or more membranes in series or parallel fluidly communicating with a retentate outlet(s) of the membranes of the first gas separation membrane stage so as to receive retentate from the first gas separation membrane stage as a feed gas in the second gas separation membrane stage, each membrane of the second gas separation membrane stage having a selective layer that is selective for $CO_2$ over methane, wherein:

the one or more membranes of the first gas separation membrane stage have a methane permeance of less than 68 gas permeation units (22.4 mol/m$^2$·sec·Pa); and the one or membranes of the first gas separation membrane stage have a separation layer made of: 1) a copolymer or block polymer of tetramethylene oxide, 2) a copolymer or block polymer of tetramethylene oxide and propylene oxide, 3) a copolymer or block polymer of propylene oxide, or 4) a copolymer or block polymer of ethylene oxide, terephthalate, and tetramethylene terephthalate.

21. The system of claim 20, further comprising a water removal apparatus adapted and configured to remove water from the feed gas prior to feeding the feed gas to the first gas separation membrane stage.

22. The system of claim 21, wherein said water removal apparatus is a molecular sieve adapted and configured to remove water from fluids.

23. The system of claim 21, wherein said water removal apparatus is a dehydration gas separation membrane.

24. The system of claim 20, wherein each of the one or membranes of the first gas separation membrane stage exhibits a pressure drop between a pressure of the feed gas and a pressure of the retentate gas of less than 50 psi (3.45 bar).

25. The system of claim 20, wherein each of the one or membranes of the first gas separation membrane stage exhibits a pressure drop between a pressure of the feed gas and a pressure of the retentate gas is less than 30 psi (2.07 bar).

26. The system of claim 20, wherein each of the one or membranes of the first gas separation membrane stage exhibits a pressure drop between a pressure of the feed gas and a pressure of the retentate gas is less than less than 20 psi (1.38 bar).

27. The system of claim 20, wherein each of the one or membranes of the first gas separation membrane stage exhibits a methane permeance of less than 34 GPU.

28. The system of claim 20, wherein each of the one or membranes of the first gas separation membrane stage exhibits a methane permeance of less than 20 GPU.

29. A system for purification of natural gas including methane, CO2, and $C_{3+}$ hydrocarbons, comprising:

a source of natural gas;

a first gas separation membrane stage comprising one or more membranes fluidly in series or parallel communicating with said source, each membrane of the first gas separation membrane stage having a selective layer that is selective for $C_{3+}$ hydrocarbons over methane; and a second gas separation membrane stage comprising one or more membranes in series or parallel fluidly communicating with a retentate outlet(s) of the membranes of the first gas separation membrane stage so as to receive retentate from the first gas separation membrane stage as a feed gas in the second gas separation membrane stage, each membrane of the second gas separation membrane stage having a selective layer that is selective for $CO_2$ over methane, wherein:

the one or more membranes of the first gas separation membrane stage have a methane permeance of less than 68 gas permeation units (22.4 mol/m$^2$·sec·Pa); and the one or membranes of the first gas separation membrane stage have a separation layer made of a copolymer or block polymer of the formula:

$$HO\!\!-\!\!\left[\!\!C(=O)\!\!-\!\!PA\!\!-\!\!C(=O)\!\!-\!\!PE\!\!-\!\!O\right]_n\!\!-\!\!H$$

where PA is an aliphatic polyamide having 6 or 12 carbon atoms and PE is either poly(ethylene oxide) poly(tetramethylene oxide).

30. The system of claim 20, wherein one or membranes of the first gas separation membrane stage have a separation layer made of repeating units of the following monomers:

$$\left[\!\!-\!\!O\!\!-\!\!CH_2\!\!-\!\!CH_2\!\!-\!\!\right]_n\!\!-\!\!O\!\!-\!\!C(=O)\!\!-\!\!C_6H_4\!\!-\!\!C(=O)\!\!-\!\!\right]_x$$

$$\left[\!\!-\!\!O\!\!-\!\!(CH_2)_4\!\!-\!\!O\!\!-\!\!C(=O)\!\!-\!\!C_6H_4\!\!-\!\!C(=O)\!\!-\!\!\right]_y.$$

31. The system of claim 20, wherein the one or more membranes of the first gas separation membrane stage are formed as flat films or as a plurality of hollow fibers.

32. The system of claim 20, wherein each of the one or more membranes of the first gas separation membrane stage has a separation layer that is supported by a support layer.

33. The system of claim 32, wherein each of the support layers is made of a polyimide, polysulfone, or polyether ether ketone.

34. The system of claim 33, wherein each of the support layers is porous and is made of polyether ether ketone.

35. The system of claim 20, wherein each of the membranes of the second gas separation membrane stage is made of cellulose acetate, a polysulfone, or a polyimide.

* * * * *